A. B. SHAW.
GARDEN RAKE.
APPLICATION FILED AUG. 23, 1913.

1,146,287. Patented July 13, 1915.

Witnesses:
N. C. Lombard
M. C. Smith

Inventor:
Ai B. Shaw,
by Walter E. Lombard,
Atty.

UNITED STATES PATENT OFFICE.

AI B. SHAW, OF MEDFORD, MASSACHUSETTS.

GARDEN-RAKE.

1,146,287.  Specification of Letters Patent.  Patented July 13, 1915.

Application filed August 23, 1913. Serial No. 786,330.

*To all whom it may concern:*

Be it known that I, AI B. SHAW, a citizen of the United States of America, and a resident of Medford, in the county of Middlesex and State of Massachusetts, have invented certain new and useful Improvements in Garden-Rakes, of which the following is a specification.

This invention relates to lawn or garden rakes, and has for its object the production of an article of this class which is particularly adapted to prevent clogging when in use.

The invention consists in providing a toothed member which is detachable from the handle portion to facilitate packing and shipping, and which toothed portion is provided with a back plate extending upwardly for some distance above the teeth.

The invention further consists in curving the teeth and forming enlarged outer ends thereon, all of the teeth being connected by thin stiffening webs, each web being provided with a V-shaped notch extending upwardly to the horizontal stiffening rib of said toothed member.

The invention further consists in certain novel features of construction and arrangement of parts which will be fully understood by reference to the description of the drawings and to the claim hereinafter given.

Figure 1:
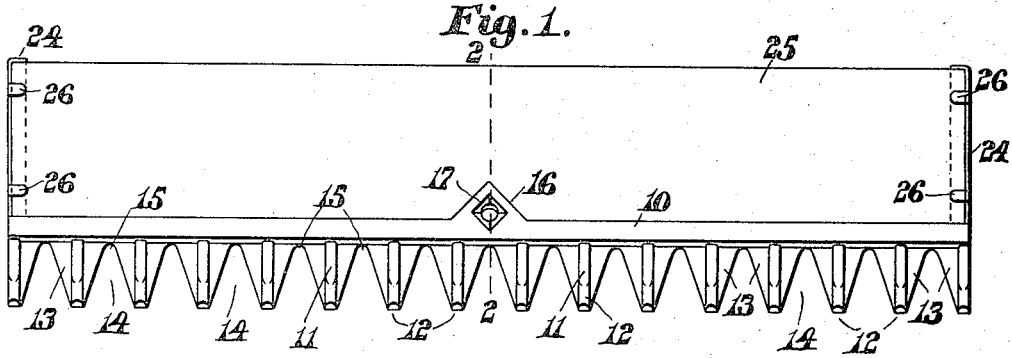
Figure 2:
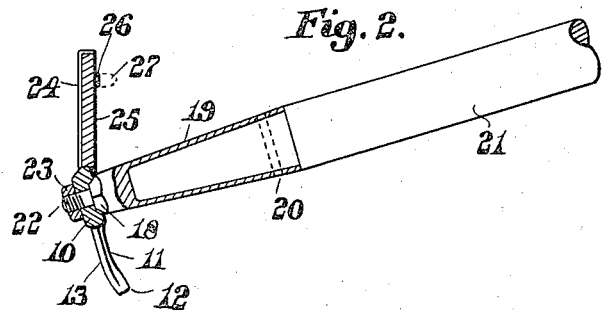
Figure 3:
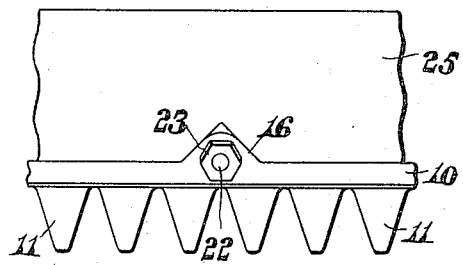

Of the drawings, Figure 1 represents an elevation of the body portion of the rake, showing the handle detached therefrom. Fig. 2 represents a vertical section of the same, the cutting plane being on line 2—2 on Fig. 1, and showing a portion of the handle attached thereto, and Fig. 3 represents a rear view of a central portion of said rake.

Similar characters designate like parts throughout the several figures of the drawings.

In the drawings, the body portion of the rake consists of a horizontal stiffening bar 10, having projecting downwardly therefrom a plurality of teeth 11, the outer end of each of which is enlarged as indicated at 12. Interposed between the adjacent teeth and formed integral therewith are thin stiffening ribs 13, each having formed therein a V-shaped notch 14, the vertex of which is semi-circular, as indicated at 15. The bar 10 has extending upwardly therefrom a projection 16 having a squared socket 17 having inclined sides. This socket 17 is adapted to receive the pyramidal end 18 of a ferrule 19 secured by means of a pin 20 to the end of the handle 21. Projecting from the end of the ferrule 19 and in axial alinement therewith is a threaded stud 22 extending through an opening in the projection 16 and having threaded to its outer end a securing nut 23.

The bar 10 is provided at each end with the upwardly extending members 24, said members being L-shape in cross section, thus forming seats for the ends of the back plate 25 which may be of thin wood or any light material.

The extensions 24 are provided with a plurality of clips 26, which normally extend outwardly as indicated at 27 in Fig. 2 of the drawings, thereby permitting the positioning of the plate 25 with its ends resting against the back plate of said extensions 24. When the plate 25 has been thus positioned the clips 26 are bent over the front face of the plate as indicated in Fig. 1 to prevent accidental displacement thereof.

The handle is attached to the stiffening bar 10 at right angles to its front face and the teeth 11 are curved forwardly as indicated in Fig. 2 of the drawings, the outer ends of each tooth being considerably enlarged to prevent digging into the roots of the grass or other material when the rake is in use. This is further prevented by means of the thin webs between the adjacent teeth. When the rake is being used upon the lawn the blunt enlarged ends of the teeth will prevent the roots of the grass being engaged and pulled from the soil, as is true when the ordinary rake is used. Any loose grass disconnected from the ground will be moved upwardly in front of the back plate 25 and be carried forward thereby while the blades of rooted grass will pass through the V-shaped notches 14. As these notches extend upwardly to the horizontal bar 10 and are curved at their vertexes as indicated at 15, there is no possible opportunity for the grass to become caught and broken or uprooted.

It is self-evident that, owing to the shape of the teeth and the notches between them, it is impossible for leaves, grass, or other material to become wedged in between said teeth, as in the case of rakes in which the teeth are straight and parallel. In view of the fact that the teeth are short and the spaces between them are V-shaped, it is possible to rake gravel, small fruit, or any fine substances from the grass on a lawn with ease and very quickly.

There is considerable advantage in having the rake of knock-down construction, as by this means the handles may be disconnected and tied in bundles occupying but very little space while the body portion of the rakes may be stacked in very small compass. This is not only a great convenience in shipping, but also in storage in both the wholesale and retail houses.

It is believed that the operation and many advantages of the invention will be thoroughly understood from the foregoing description.

Having thus described my invention, I claim:

A lawn rake consisting of a horizontal bar having downwardly projecting teeth and an upward extension at each end provided with a shouldered seat and retaining clips and a back plate the ends of which rest in said seats and are secured to said extensions by means of said clips.

Signed by me at 4 Post Office Sq., Boston, Mass., this 20th day of August, 1913.

AI B. SHAW.

Witnesses:
WALTER E. LOMBARD,
EDWARD F. ALLEN.

Copies of this patent may be obtained for five cents each, by addressing the "Commissioner of Patents, Washington, D. C."